US008942902B2

(12) United States Patent
Moseler

(10) Patent No.: US 8,942,902 B2
(45) Date of Patent: Jan. 27, 2015

(54) APPARATUS, METHOD AND COMPUTER PROGRAM FOR ACTUATING A DISCONNECT CLUTCH

(71) Applicant: ZF Friedrichshafen AG, Friedrichshafen (DE)

(72) Inventor: Olaf Moseler, Werneck (DE)

(73) Assignee: ZF Friedrichshafen AG, Friedrichshafen (DE)

(*) Notice: Subject to any disclaimer, the term of this patent is extended or adjusted under 35 U.S.C. 154(b) by 36 days.

(21) Appl. No.: 13/782,398

(22) Filed: Mar. 1, 2013

(65) Prior Publication Data
US 2013/0231836 A1 Sep. 5, 2013

(30) Foreign Application Priority Data
Mar. 1, 2012 (DE) .......................... 10 2012 203 184

(51) Int. Cl.
| | | |
|---|---|---|
| *G06F 7/00* | (2006.01) | |
| *F16H 61/26* | (2006.01) | |
| *F16D 11/00* | (2006.01) | |
| *F16D 48/02* | (2006.01) | |
| *B60K 6/00* | (2006.01) | |
| *B60K 6/48* | (2007.10) | |

(52) U.S. Cl.
CPC . *F16D 25/14* (2013.01); *B60K 6/00* (2013.01); *F16D 48/02* (2013.01); *B60K 6/48* (2013.01); *B60K 2006/4825* (2013.01)
USPC .......................... 701/68; 477/127; 192/30 R

(58) Field of Classification Search
USPC ............. 701/68, 63; 477/5, 39, 52; 180/65.21
See application file for complete search history.

(56) References Cited

U.S. PATENT DOCUMENTS

| | | | | |
|---|---|---|---|---|
| 5,655,996 | A * | 8/1997 | Ohtsuka ........................ | 477/166 |
| 7,134,980 | B2 * | 11/2006 | Kroppe ........................... | 475/86 |
| 7,608,011 | B2 * | 10/2009 | Grabowski et al. .............. | 477/5 |
| 8,267,233 | B2 * | 9/2012 | Grethel .................... | 192/48.611 |
| 8,529,402 | B2 * | 9/2013 | Kirchner ........................ | 477/52 |
| 8,613,681 | B2 * | 12/2013 | Sowards et al. ............... | 475/127 |
| 8,616,355 | B2 * | 12/2013 | Ishikawa et al. ............. | 192/3.29 |
| 2012/0055146 | A1 * | 3/2012 | Baraga et al. .................... | 60/327 |
| 2012/0083385 | A1 * | 4/2012 | Smith et al. ....................... | 477/5 |
| 2012/0103709 | A1 * | 5/2012 | Mochiyama et al. ...... | 180/65.21 |
| 2012/0244993 | A1 * | 9/2012 | Ishida et al. ................... | 477/39 |
| 2013/0080009 | A1 * | 3/2013 | Zhang et al. .................... | 701/63 |

FOREIGN PATENT DOCUMENTS

| | | |
|---|---|---|
| DE | 10 2006 060 871 A1 | 7/2008 |
| DE | 10 2010 039 401 A1 | 2/2012 |
| WO | WO 2012/022525 A1 | 2/2012 |

* cited by examiner

*Primary Examiner* — Thomas G Black
*Assistant Examiner* — Tyler Paige
(74) *Attorney, Agent, or Firm* — Cozen O'Connor

(57) ABSTRACT

An apparatus, method and computer for actuating a disconnect clutch which is arranged between a first drive unit and a second drive unit of a hybrid drive and which can be actuated by means of a hydraulic actuating element in order to couple or decouple the first drive unit to or from the rest of a powertrain. This is accomplished by adapting a transmission hydraulic pressure level to a disconnect clutch hydraulic pressure level required for actuating the disconnect clutch by a pressure converter arranged between the actuating element and a hydraulic medium supply for a transmission.

18 Claims, 4 Drawing Sheets

APPARATUS, METHOD AND COMPUTER PROGRAM FOR ACTUATING A DISCONNECT CLUTCH

BACKGROUND OF THE INVENTION

1. Field of the Invention

The present invention is directed to apparatuses, methods and computer programs for actuating a disconnect clutch such as can be used particularly for vehicles with hybrid drives and which is arranged between a first drive unit and a second drive unit of a hybrid drive.

2. Description of the Related Art

By hybrid drive is meant a vehicle drive having more than one drive unit or drive source. In this case, a first drive unit is generally an internal combustion engine, e.g., an Otto engine or diesel engine, while a second drive unit is generally designed as an electric machine or electric motor. Based on a variety of factors, hybrid drives can be classified as micro hybrid drives, mild hybrid drives, medium hybrid drives or full hybrid drives. A full hybrid drive allows driving with the electric motor as exclusive drive source. Although the following description addresses full hybrid drives in particular, embodiment examples of the present invention are not limited exclusively to full hybrid drives.

A distinction can be drawn between a serial hybrid system and a parallel hybrid system based on the arrangement and mechanical connection of the two drive units. In a serial hybrid system, the entire output of the internal combustion engine is converted into electrical energy by a generator so that the vehicle is driven exclusively by the electric motor powered by the generator. However, present-day passenger cars with full hybrid drive use what is known as a parallel hybrid system. In this case, the internal combustion engine and the electric motor both drive the axle drive and wheels. The electric motor draws its electric power from a battery which is charged by the electric motor or the electric machine itself in that the latter is operated as a generator during driving.

FIG. 1 is a schematic diagram showing the construction of a conventional powertrain 100 of a full hybrid vehicle.

The parallel hybrid drive 100, shown schematically, has a serial arrangement of an internal combustion engine 110, an electric machine 12 constructed as an engine starter generator, and a drive transmission 130 connected to the driven side of an axle drive. Arranged between the internal combustion engine 110 and the electric machine 120 is a disconnect clutch (K0) 115 which allows the internal combustion engine 110 to be disconnected from the rest of the powertrain and accordingly makes it possible to change to a fully electric drive operation. The powertrain 100 further comprises a starting clutch 125 which is coupled between the electric motor 120 and a transmission input shaft 126 of the transmission 130. Accordingly, the starting clutch 125 can couple a shaft 121 of the electric motor 120 to the transmission input shaft 126 so that the transmission input shaft 126 is indirectly coupled to the electric motor 120 by the starting clutch 125. Here, the term "couple" is to be understood as a torque-transmitting coupling between the electric motor 120 and transmission input shaft 126.

The disconnect clutch (K0) 115 is driven by the internal combustion engine 110 via a clutch input shaft 111. On the output side, the disconnect clutch 115 is connected to the electric machine shaft 121. The internal combustion engine 110 can be started by a separate belt starter or a conventional starter. But the internal combustion engine 110 can also be accelerated by closing or applying the disconnect clutch (K0) 115. In either case, the disconnect clutch 115 can be fully closed at the latest when the internal combustion engine 110 has reached the electric machine speed. After this point, the internal combustion engine 110 is fixedly coupled to the rest of the powertrain and can accordingly inject its torque for the propulsion of the vehicle.

Various possibilities for actuating the disconnect clutch 115 are known from the prior art. For one, the disconnect clutch 115 can be actuated, for example, via a release lever, in which case an electromechanically or hydraulically actuated plunger can exert a force on the release lever. A conceivable alternative is to actuate the disconnect clutch 115 via an integrated electromagnetic actuator. However, an actuator of this kind will not be further considered within the framework of the present invention. Further, it is known to actuate the disconnect clutch 115 by means of a concentric slave cylinder (CSC) or central release mechanism; in this case, an actuating force for actuating the disconnect clutch 115 is generated by creating hydraulic pressure in the concentric slave cylinder. A concentric slave cylinder combines release mechanism and slave cylinder in one unit. The concentric slave cylinder offers clear advantages over conventional mechanical-hydraulic systems with respect to design, construction, upkeep and operation.

For purposes of integrating the electric machine 120 in present-day powertrains, an actuating system for the disconnect clutch 115 should be very compact and arranged ideally radially inside the electric machine 120. In view of these prerequisites, solutions using the release lever appear less attractive; therefore, embodiment examples of the present invention are concerned with actuation of the disconnect clutch 115 by means of a concentric slave cylinder.

To generate an actuating pressure for the disconnect clutch 115, which can be in the range of about 40 bar for compact actuating systems, it is known to use external hydraulic drive units. These external hydraulic drive units comprise a master cylinder which is generally actuated by an additional electric motor provided in addition to the electric machine 120. Control electronics are additionally required for this purpose. Actuators of this kind are also found in various automatic shifting transmissions. However, these known solutions for generating the actuating pressure for the disconnect clutch 115 entail high costs, greatly increased weight and a large installation space.

SUMMARY OF THE INVENTION

It is an object of the present invention to avoid the above-mentioned drawbacks of the prior art and to suggest an improved concept for actuating the disconnect clutch of a hybrid drive.

According to an embodiment of the present invention, a hydraulic actuation of the disconnect clutch or K0 clutch is realized based on transmission hydraulics of an adjoining transmission, particularly of a hydraulically actuated transmission. Particularly in a very compact actuation system for the disconnect clutch, a required disconnect clutch hydraulic pressure level, i.e., a hydraulic pressure level required for actuating the disconnect clutch, differs from a transmission hydraulic pressure level provided by the transmission. Consequently, a pressure converter is provided between an actuating element for hydraulic actuation of the disconnect clutch and the transmission in order to adapt the transmission hydraulic pressure level to the disconnect clutch hydraulic pressure level required for actuating the disconnect clutch. Accordingly, embodiments of the present invention provide for the integration of a pressure converter or pressure translator between a hydraulic supply of the transmission and the actuating element for hydraulic actuation of the disconnect clutch.

According to a first aspect of the present invention, an apparatus is disclosed for actuating a disconnect clutch which is arranged between a first drive unit and a second drive unit of a hybrid drive and which can be actuated or is actuated hydraulically in order to couple the first drive unit to the rest of a powertrain or in order to decouple the first drive unit from the powertrain. The apparatus comprises an actuating element for hydraulic actuation of the disconnect clutch and a pressure converter arranged between the actuating element and a hydraulic medium supply for the transmission in order to adapt a transmission hydraulic pressure level to a disconnect clutch hydraulic pressure level required for actuating the disconnect clutch.

The first drive unit, or first driving machine, can be an internal combustion engine, e.g., an Otto engine or diesel engine. The second drive unit can be an electric machine, particularly an electric motor or an electric machine designed as an engine starter generator. The transmission is a hydraulically actuated transmission, e.g., an automatic shifting transmission, in which an actuation of a clutch and a shifting of gears are carried out electrohydraulically. The hydraulic actuating element, which can also be designated as hydraulic disconnect clutch actuator, serves for hydraulic actuation of a release mechanism of the disconnect clutch. The release mechanism in turn can have a displaceable piston which is actuated by a concentric slave cylinder (CSC). The disconnect clutch can be designed as a dry clutch, for example, as a single-disk dry clutch, having a flywheel, a pressure plate and a pressure plate housing. The engine torque is transmitted by the disconnect clutch to the clutch disk and, therefore, to a shaft of the internal combustion engine or electric motor via the flywheel and the pressure plate through friction.

The hydraulic actuating element has the task of transmitting a releasing force from a stationary hydraulic connection to the pressure plate housing. For this purpose, a hydraulic connection of the hydraulic actuating element is coupled to the hydraulic supply of the transmission via the pressure converter.

The transmission hydraulic pressure level in the transmission or automatic transmission can be in a range between 6 and 15 bar, for example. However, the hydraulic actuating element which can have a concentric slave cylinder arranged on the high-pressure side of the pressure converter for actuating the disconnect clutch requires a pressure or disconnect clutch hydraulic pressure level in a range of, e.g., about 20 to 40 bar so that a ratio between the disconnect clutch hydraulic pressure level and the transmission hydraulic pressure level according to embodiment examples of the present invention can lie in a range between 3 and 10, particularly between 5 and 8.

According to another embodiment, the hydraulic actuating element has a central release mechanism or concentric slave cylinder (CSC) arranged on a high-pressure side of the pressure converter for actuating the disconnect clutch. In so doing, the actuating element can be configured to actuate the concentric slave cylinder by means of a hydraulic medium or hydraulic fluid that is used in the transmission and serves as disconnect clutch hydraulic medium. In known CSC systems, brake fluid, particularly polyglycol based or silicone based or mineral oil based fluids, are used as transmission medium. Although this would also be possible in principle in the embodiment examples (for use in the high-pressure cylinder), this would require a corresponding sealing concept between a transmission oil or ATF and the brake fluid (CSC oil). Therefore, it seems more sensible to use the hydraulic transmission oil or ATF for actuating the concentric slave cylinder as well. In this case, sealing between the low-pressure side and high-pressure side of the pressure converter can be carried out in a simpler manner.

To unlock the disconnect clutch (K0), it may be necessary to detect or sense a release travel of the disconnect clutch. For this purpose, the apparatus for actuating the disconnect clutch can have a sensor arrangement coupled to a hydraulic control to determine the release travel of the disconnect clutch and to control or adjust the transmission hydraulic pressure level based on the sensed release travel. According to an embodiment, a signal generator, e.g., a permanent magnet, can be arranged for this purpose in or on a piston of the pressure converter and a sensor element can be arranged at an outer wall of the pressure converter, e.g., at an outer wall of the high-pressure cylinder. However, according to another embodiment example, it is also possible to arrange a signal generator and sensor element on the low-pressure side of the pressure converter.

According to some embodiments, the high-pressure cylinder of the pressure converter can be constructed as a separate component. This has the advantage that the separate high-pressure cylinder can be arranged virtually anywhere in the vehicle. To economize on additional structural component parts of the housing, however, both an input-side low-pressure cylinder and an output-side high-pressure cylinder of the pressure converter can be integrated in the transmission or in the transmission housing.

According to some other embodiments, a proportional valve which is controlled by a hydraulic control device and which particularly includes a servo valve, can be provided for controlling the low-pressure cylinder of the pressure converter with a hydraulic fluid. The servo valve can be designed either as a cartridge valve or as a pilot valve (electric pressure regulator) with follow-up slide. A cartridge valve is constructed as a spool valve. This means that a piston which variously connects different ports of the valve through its positions runs in a cartridge-like central bushing in longitudinal direction thereof. A pilot valve acting as servo valve requires a relatively small force, e.g., applied to a hydraulic piston, to enable actuation of a larger follow-up slide. A proportional pressure valve which adjusts a pressure in the low-pressure cylinder proportional to the valve flow can be used, for example, for the follow-up slide for controlling the low-pressure cylinder. However, a proportional volume flow valve in which a volume flow of hydraulic fluid can be adjusted proportional to the volume flow can also advantageously be used. The valve can be integrated directly in the hydraulic transmission control device.

According to some embodiments, the disconnect clutch (K0) between the first drive unit and second drive unit can be a clutch that is closed in the unactuated condition (normally closed clutch). However, the disconnect clutch (K0) should remain open for fully electric driving operation. Accordingly, when a normally closed disconnect clutch is used it must be constantly actuated or compressed for fully electric driving operation. Assuming that a hydraulic transmission pump is coupled with the second drive unit or electric machine and therefore only delivers hydraulic pressure when the electric machine is running, a problem would arise when the electric machine does not rotate and therefore cannot drive the pump. In that case, the disconnect clutch (K0) could not be compressed and accordingly also not opened. Therefore, for producing and providing the transmission hydraulic pressure level some embodiment examples provide that the apparatus for actuating the disconnect clutch has an electrically operating hydraulic pump which is independent from the first and/or second drive unit.

For a drive system without an electric auxiliary hydraulic pump, it is disclosed within the framework of the invention that the electric machine is initially allowed to rotate by means of a correspondingly adapted or programmed control device when the vehicle is started. In this way, the internal combustion engine can initially be pulled along by means of the normally closed disconnect clutch. However, the internal combustion engine should not fire during the starting process; this can be provided for in turn in a correspondingly adapted or programmed engine control. As soon as a hydraulic pump driven by the rotating electric machine has generated sufficient pressure, the disconnect clutch (K0) can be opened so that the rotational speed of the internal combustion engine can decrease again to zero rpm (revolutions per minute). After this, normal electric driving operation is possible. Thus according to embodiment examples of this kind, the apparatus for actuating the disconnect clutch can be designed to set the electric machine, particularly an engine starter generator, in rotation when starting the vehicle and therefore also to set the internal combustion engine in rotation without ignition by means of the unactuated disconnect clutch until reaching the transmission hydraulic level so that the disconnect clutch can finally be opened for an electric driving operation.

In order that this process takes place only once when starting the vehicle, it is provided in some embodiment examples that the speed of the electric machine no longer drops to 0 rpm as driving proceeds (e.g., when the vehicle is stopped at a traffic light). Instead, the apparatus for actuating the disconnect clutch can be designed to allow the electric machine to continue rotating at a predetermined speed also when the vehicle is stopped so that the electric machine coupled with a hydraulic pump can supply a sufficient actuating pressure for actuating the disconnect clutch in order to keep the normally-closed disconnect clutch open. Starting processes and maneuvering processes would then be controlled by means of a starting clutch in the transmission. In other words, the apparatus can be designed to keep a speed of the electric machine above a minimum speed while operating a vehicle so that the transmission hydraulic pressure level for actuating the disconnect clutch is always maintained during operation by means of a hydraulic pump supplied by the electric machine.

According to some embodiments, the speed or minimum speed of the electric machine can be variously adjusted depending upon temperature. Due to a generally low leakage of hydraulic fluid, a lower speed can be sufficient at low temperatures, e.g., 300 rpm at 20° C. A speed or minimum speed higher than this can be adjusted at higher temperatures, e.g., 700 rpm at 100° C. hydraulic fluid temperature. Depending on the design of the disconnect clutch (K0), an actuation pressure that is up to 50% lower than the maximum possible actuation pressure can be sufficient for keeping the clutch in the open position so that the (minimum) speed level of the electric machine can also be decreased correspondingly.

In addition or alternatively, according to some embodiments, blocking means can also be provided in a high-pressure line from the pressure converter to the concentric slave cylinder, which blocking means can be electrically controlled so as to close when fully electric driving is wanted. In embodiments of this kind, a hydraulic pump need not be continuously driven by the electric machine. In other words, a controllable blocking element, e.g., a high-pressure valve, can be provided in a high-pressure line from the pressure converter to the actuating element in order to maintain the disconnect clutch hydraulic pressure level in the high-pressure line independently from a hydraulic pump by controlling the blocking element in a corresponding manner.

According to further embodiments, the disconnect clutch (K0) can also be a clutch which is open in the unactuated condition (normally open clutch) and which is actuated or compressed for coupling the internal combustion engine to the drivetrain. A normally open disconnect clutch of this kind could remain uncompressed in fully electric machine operation. The normally open disconnect clutch can be hydraulically actuated or compressed when the internal combustion engine is to be switched on or when driving is to take place by means of the internal combustion engine. When the internal combustion engine is switched on, the speed of the electric machine is usually above an idling speed of the internal combustion engine anyway, so that there would be sufficient pressure or a sufficient transmission hydraulic pressure level in this case to actuate the disconnect clutch.

The clutch remains permanently open during internal combustion engine operation. In view of the fact that the battery in current hybrid systems has only a low power capacity, the internal combustion engine operating time appreciably exceeds the electric machine operating time. The principle of the normally open clutch requires that it be held closed constantly during internal combustion engine operation. As a result, a large force is constantly exerted on the clutch release bearing which is acted upon by the CSC. To reduce the load on the release bearing and to allow the lowest possible system pressure level in the transmission hydraulics, it is suggested according to the invention that the K0 torque or disconnect clutch torque track the internal combustion engine torque in internal combustion engine operation. This means that the hydraulic pressure in the pressure converter and, therefore, the pressure in the CSC and accordingly ultimately the force on the clutch release bearing is always only high enough that the friction force on the clutch is sufficient for transmitting the torque of the internal combustion engine. In order to prevent easy slippage particularly under increased load, the pressure level can also be increased slightly above the pressure that would be required to transmit the torque. However, it can also be advantageous to operate directly at the slippage limit so as to eliminate any torque irregularities resulting from the pulse-like compression profile of the internal combustion engine by slipping and thus prevent powertrain fluctuations and therefore bothersome humming noises.

A further aspect of the present invention relates to a method for actuating a disconnect clutch which is arranged between a first drive unit (e.g., the internal combustion engine) and a second drive unit (e.g., the electric machine) of a hybrid drive and which can be actuated by means of a hydraulic actuating element in order to couple or decouple the first drive unit to or from the rest of the powertrain. The method comprises a step for adapting a transmission hydraulic pressure level to a disconnect clutch hydraulic pressure level required for actuating the disconnect clutch by means of a pressure converter which is arranged between the actuating element and a hydraulic medium supply for the transmission.

According to a third aspect of the present invention, a computer program is provided with a programming code for controlling a hydraulic pump that is connected to a pressure converter so that a hydraulic pressure level in a transmission environment can be adapted by means of a pressure converter to a disconnect clutch hydraulic pressure level required for actuating a disconnect clutch when the computer program runs on a programmable hardware component, e.g., a hydraulic control device.

In an advantageous manner, embodiment examples of the present invention allow a very compact construction of an actuating system for a disconnect clutch (K0) of a hybrid drive and the arrangement thereof ideally radially inside the electric machine of the hybrid drive. The small working surfaces of the hydraulic actuating system resulting from the compact construction require a comparatively high disconnect clutch hydraulic pressure level which can be supplied, according to the invention, by the pressure converter and the transmission hydraulics. The pressure converter can be integrated at least partially in the transmission so that additional, bulky housing parts for the actuating system of the disconnect clutch can be dispensed with.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
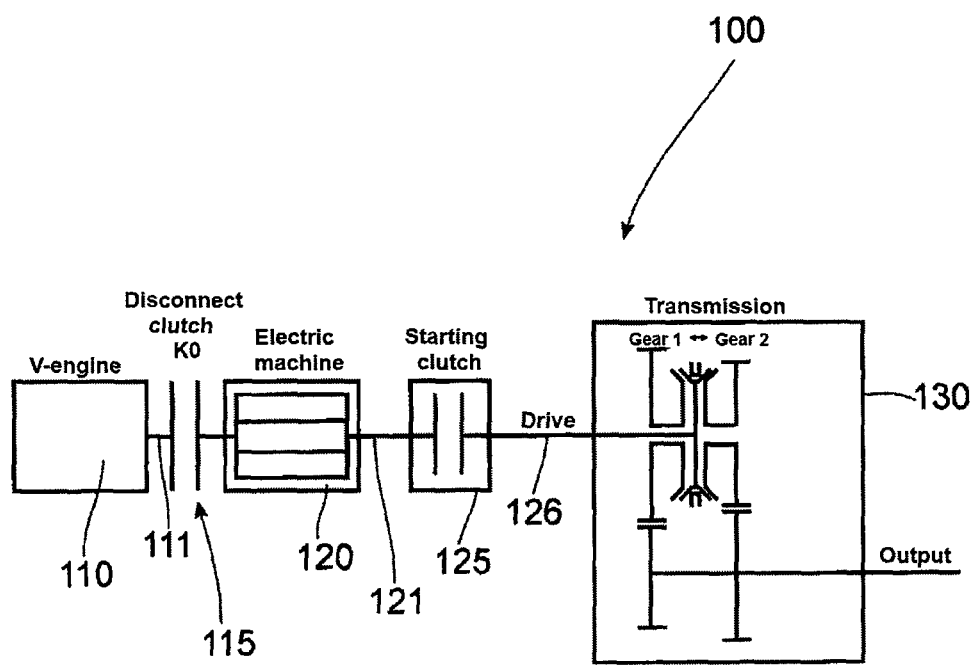
FIG. 1 is a schematic illustration of a conventional hybrid powertrain.

In the following exemplary description of several embodiments of the present invention, identical reference numerals designate identical or similar structural component parts or components or those functioning in an identical manner.

Figure 2:
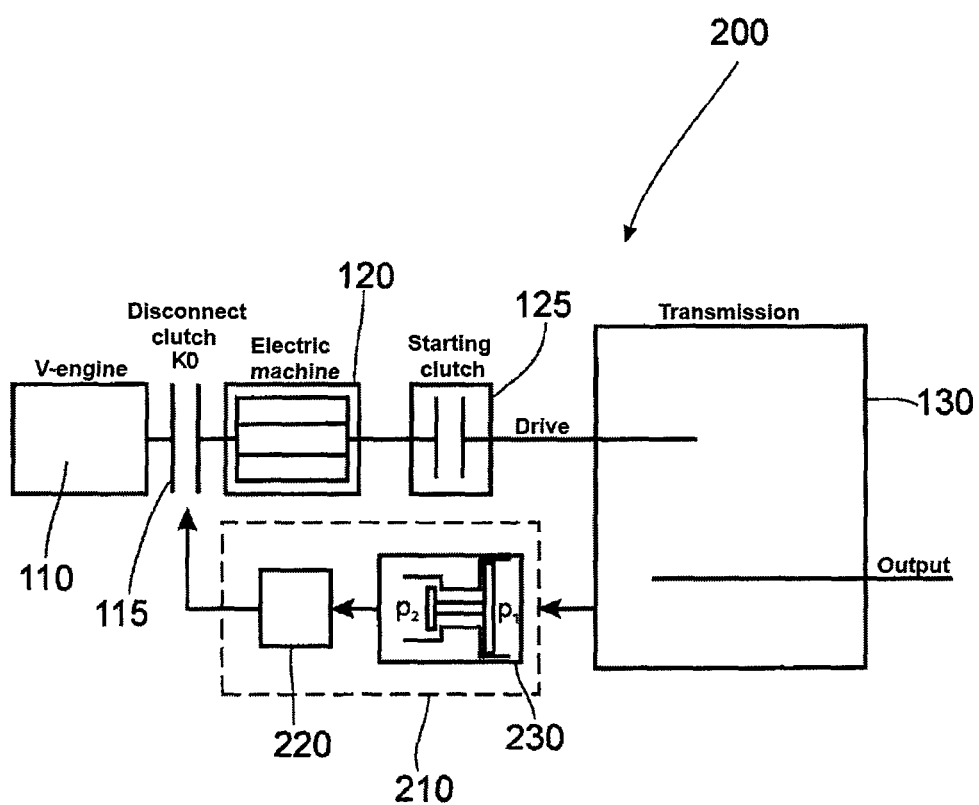
FIG. 2 is a schematic illustration of a hybrid powertrain with an apparatus for actuating the disconnect clutch according to an embodiment example of the present invention.

FIG. 2 shows a schematic illustration of a hybrid drive unit 200 according to an embodiment of the present invention.

The hybrid drive unit 200 shown in FIG. 2 differs from the conventional hybrid drive unit 100 described above with reference to FIG. 1 in that it has an apparatus 210 for actuating a disconnect clutch (K0) 115 which is arranged between a first drive unit 110, e.g., an internal combustion engine, and a second drive unit 120, e.g., an electric machine, and which requires for actuation thereof a disconnect clutch hydraulic pressure level $p_2$ diverging from a transmission hydraulic pressure level $p_2$ of a hydraulically actuated transmission 130. With respect to the system, the apparatus 210 is arranged between the transmission 130 and the disconnect clutch 115. According to embodiment examples, it can be integrated in its entirety or at least partially in the transmission 130 or the housing thereof. The apparatus 210 comprises an actuating element or hydraulic actuator 220 for hydraulic actuation of the disconnect clutch 115 and for actuating the central release mechanism thereof or CSC. Further, the apparatus 210 has a pressure converter 230 arranged between the actuating element 220 and a hydraulic fluid supply or hydraulic medium supply of the transmission 130 in order to adapt the transmission hydraulic pressure level $p_2$ to the disconnect clutch hydraulic pressure level $p_2$ required for actuating the disconnect clutch 115. In principle, the disconnect clutch hydraulic pressure level $p_2$ can be lower or higher than the transmission hydraulic pressure level $p_1$; because of the preferably small installation space of the hydraulic actuating element 220 and, accordingly, because of its small working surfaces the disconnect clutch hydraulic pressure level $p_2$ is generally greater than the transmission hydraulic pressure level $p_1$.

Figure 3:
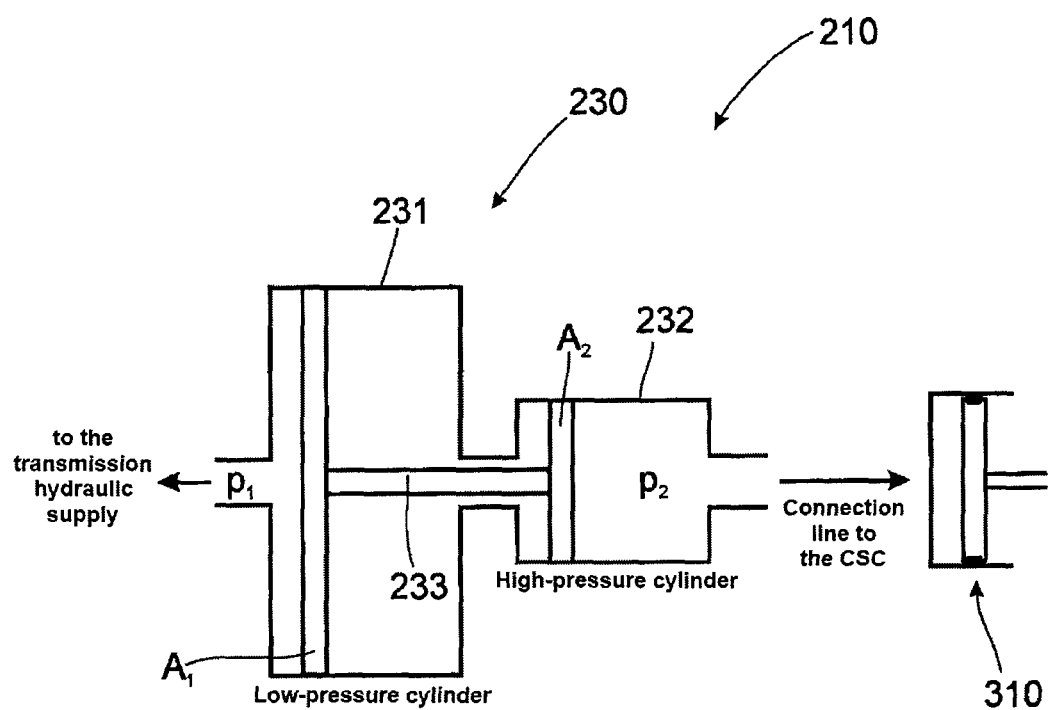
FIG. 3 is a schematic diagram showing a possible hydraulic pressure translator.

FIG. 3 shows an enlarged view of the pressure converter 230 for adapting an input-side or low-pressure-side transmission hydraulic pressure level $p_1$ to an output-side or high-pressure-side disconnect clutch hydraulic pressure level $p_2$ required for actuating the disconnect clutch 115 so that a central release mechanism 310 or CSC of the disconnect clutch 115 can be actuated by means of the disconnect clutch hydraulic pressure level $p_2$. Accordingly, the actuating element 220 comprises a concentric slave cylinder 310 arranged on the high-pressure side of the pressure converter 230 for actuating the disconnect clutch. The pressure converter 230 comprises a low-pressure cylinder 231 on the transmission side and a high-pressure cylinder 232 on the side facing the disconnect clutch. Located between the low-pressure cylinder 231 and the high-pressure cylinder 232 is a piston 233 having a piston surface $A_1$ on its low-pressure side and a piston surface $A_2 < A_1$ on the high-pressure side. A force $F_1 = p_2 \times A_1$ exerted on the piston 233 on the low-pressure side must match a force $F_2 = p_2 \times A_2$ on the high-pressure side, i.e., $p_1 \times A_1 = p_2 \times A_2$. This gives the ratio of pressures $p_1/p_2$ in the pressure converter 230 as $p_1/p_2 = A_2/A_1$. Accordingly, the ratio of transmission hydraulic pressure level $p_1$ to disconnect clutch hydraulic pressure level $p_2$ is a reciprocal of the ratio of the piston surfaces $A_1$, $A_2$. This will be explained based on the following exemplary calculation: with an actuating surface $A_2$ for the concentric slave cylinder 310 of 400 mm² and a maximum required actuation pressure for the concentric slave cylinder of 40 bar, this gives a pressure ratio of 40 bar/6 bar=6.66 at a minimum available pressure in the transmission of 6 bar. Accordingly in embodiment examples, the disconnect clutch hydraulic pressure level $p_2$ is higher than the transmission hydraulic pressure level $p_1$ such that a ratio between the disconnect clutch hydraulic pressure level and the transmission hydraulic pressure level is in a range between 3 and 10, particularly between 5 and 8. Given a pressure ratio of $p_2/p_1=6.66$, this results in an actuating surface $A_1$ in the low-pressure cylinder 231 of $A_2 \times 6.66 = 400$ mm² $\times 6.66 = 2.666$ mm². This gives a diameter for the low-pressure cylinder 231 of about 60 mm. At a maximum required volume flow for the concentric slave cylinder 310 of 3.5 l/min, this gives a maximum required volume flow for the low-pressure cylinder of 3.5 l/min $\times 6.66 = 23.3$ l/min.

In principle, these merely exemplary values (6 bar pressure and 23.3 l/min volume flow in the transmission-side low-pressure cylinder 231) lie in a range such that they can be met by hydraulic systems integrated in typical automatic transmissions 130. However, the maximum volume flow of 23.3 l/min on the low-pressure side is not always required in the low-pressure cylinder 231.

In conventional CSC systems, brake fluid is often used as transmission medium for actuating the concentric slave cylinder or CSC 310. The use of brake fluid in the high-pressure cylinder 232 of the pressure converter 230 would also be possible in principle within the framework of the present invention, but this would require a corresponding sealing concept between a low-pressure side hydraulic transmission oil (ATF) and the high-pressure side brake fluid or CSC oil. Therefore, it seems more sensible particularly for reasons of cost to use the hydraulic medium (ATF) which is already being used by the transmission 130 for actuating the CSC 310 on the low-pressure side as well as on the high-pressure side. In this case, sealing between the low-pressure side and high-pressure side of the pressure converter 230 can be carried out in a simpler manner. Accordingly, the actuating element 220 can be configured to actuate the concentric slave cylinder 310 by means of a hydraulic fluid used in the transmission 130 as hydraulic fluid for the disconnect clutch. However, the sealing concept will not be further pursued within the framework of the present invention.

Figure 4:
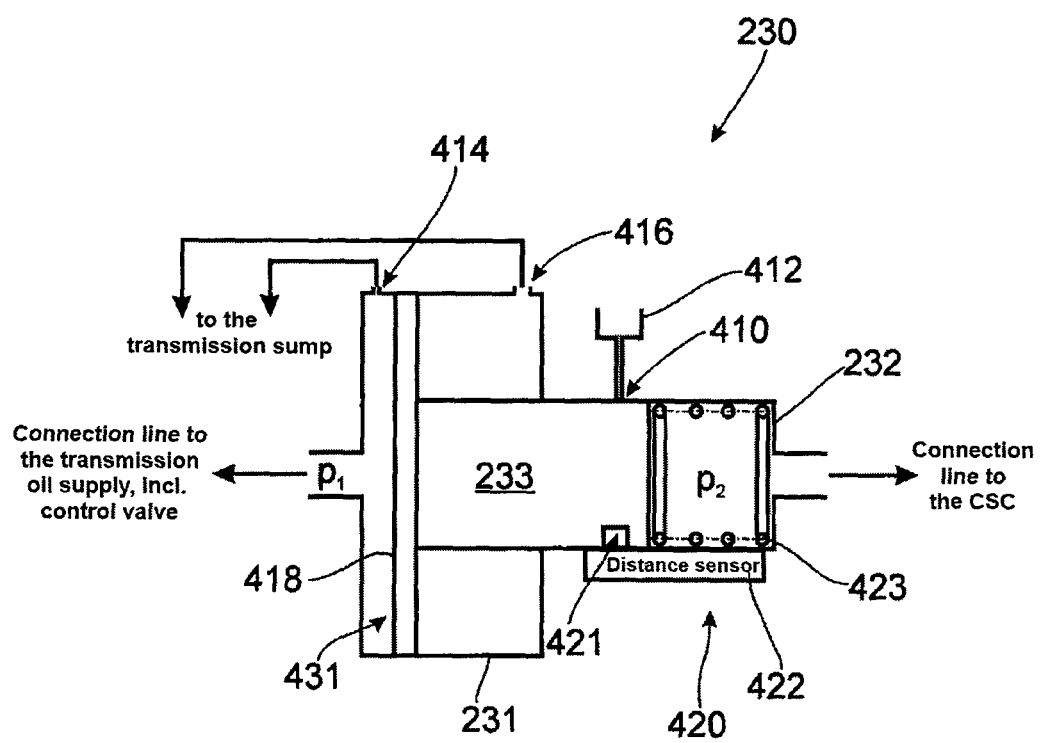
FIG. 4 is a schematic diagram of a hydraulic pressure translator with bores for pressure compensation and venting and a distance sensor for determining a disconnect clutch release travel.

FIG. 4 shows a further embodiment for a pressure converter 130 according to the present invention which is integrated in the system between transmission 130 and disconnect clutch 115. For purposes of venting and wear compensation, at least one snifting bore 410 connecting the high-pressure cylinder 232 to a compensating reservoir 412 for the high-pressure-side hydraulic fluid can be provided in the high-pressure region on the disconnect clutch side, i.e., in the high-pressure cylinder 232. The snifting bore or compensating bore 410 connects the compression space of the high-pressure cylinder 232 to the hydraulic fluid compensating reservoir 412 so that a pressure balance and volume balance, e.g., due to temperature variations, can take place by means of the snifting bore 410 in the idle state of the piston 233, i.e., when the pressure converter 230 is not actuated. In so doing, it can be advantageous when the pressure converter or pressure translator 230 is so arranged in the vehicle that air is conducted upward from the CSC 310 to the pressure converter 230. Typically, an ascending angle from the CSC 310 to the pressure converter 230 of at least 5° can be considered. This means, for example, that an axis common to both pressure converter 230 and CSC 310 forms an angle with a horizontal line of at least 5° so that air can be conducted upward from the CSC 310 to the high-pressure cylinder 232 of the pressure converter 230 via a high-pressure line.

On the low-pressure side of the pressure converter 230, i.e., on the side of the low-pressure cylinder 231, venting can take place directly into the transmission 130, not explicitly shown in FIG. 4, or into the transmission sump thereof. For this purpose, a small venting bore 414 can be provided, for example, on the low-pressure side of the pressure converter 230 in the lateral surface of the low-pressure cylinder 231. Additionally, a compensation bore can be provided in a portion of the low-pressure cylinder 231 located behind a low-pressure piston working surface 418, which compensation bore has a larger diameter than 10 mm, for example, so that no overpressure or negative pressure can build up behind the piston 233 or the low-pressure piston working surface 418 due to the axial piston movement.

It can be advantageous for an adjustment of the disconnect clutch (K0) 115 to sense a release travel of the disconnect clutch 115. According to embodiment examples of the present invention, this can be carried out, for example, in the high-pressure cylinder 232 which in turn acts as a master cylinder for the concentric slave cylinder or CSC 310. Thus according to some embodiment examples, the apparatus 200 for actuating the disconnect clutch can have a sensor arrangement 420 which is coupled with a hydraulic control (not shown more fully in FIG. 4) in order to detect a release travel of the disconnect clutch 115 and to control the transmission hydraulic pressure level $p_1$ based on the detected release travel. The sensor arrangement 420 can be arranged at the high-pressure cylinder 232 of the pressure converter 230, for example. Other embodiment examples can also provide an arrangement of the sensor arrangement 420 on the low-pressure side of the pressure converter 230.

The sensor arrangement 420 can include an encoder sensor 421, e.g., in the form of a permanent magnet, in or on the piston 233 and a receptor sensor 422 at the outer wall of the high-pressure cylinder 232. The receptor sensor 422 serves to measure a magnetic field, not shown in FIG. 4, which proceeds from the encoder sensor or permanent magnet 421 at the axially displaceable piston 233. In order to measure a displacement path of the pressure converter piston 233, the encoder sensor or permanent magnet 421 is arranged at the piston 233—and, therefore, so as to be axially displaceable. The encoder sensor 421 generates a magnetic field and/or a magnetization of the piston 233 which can be measured by the receptor sensor 422. Since this magnetic field is preferably designed so as to be axially inhomogeneous, the displacement path and the position of the piston 233 can be measured directly from the strength of the magnetic field or the change in the magnetic field, and the release travel of the disconnect clutch 115 can be deduced therefrom.

According to some embodiments, the pressure converter 230 can comprise a spring element 423 so that a resetting of the piston 233 can also be ensured, for example, when an unwanted leak occurs at the CSC 310 or in case air should collect in the region of the disconnect clutch hydraulic pressure level $p_2$, or simply only to allow an initial venting of the pressure converter system through repeated actuation of the piston 233. Although FIG. 4 shows the spring element 423, i.e., the return spring, arranged on the high-pressure side or in pressure space $p_2$, a comparable spring can be arranged additionally or alternatively at the rear piston side of pressure space $p_1$, i.e., on the low-pressure side.

The high-pressure cylinder 232 of the pressure converter 230 can be constructed, for example, as a separate structural component part. This affords the advantage that the separate high-pressure cylinder 232 can be arranged virtually anywhere in a hybrid vehicle. However, to economize on any additional housing parts, embodiment examples of the present invention also provide for integrating the high-pressure cylinder 232 together with the low-pressure cylinder 231 in the vehicle transmission 130.

The control of the low-pressure cylinder 231 is not shown explicitly in FIG. 4. However, it is provided in embodiment examples to connect the low-pressure cylinder 231 to the low-pressure side transmission hydraulic system by means of a proportional valve (not shown). The proportional valve may be controlled in turn by a servo valve which can be constructed, for example, as a cartridge valve or pilot valve with follow-up slide. This servo valve, which is a slide valve, accordingly controls the proportional valve which is a proportional pressure valve or a proportional volume flow valve. Depending on the operating position of the servo valve, a hydraulic pump provided as pressure source is coupled by the proportional valve to a low-pressure space 431 of the low-pressure cylinder 231 so that a proportional transmission hydraulic pressure level $p_1$ can be provided. According to some embodiment examples, the servo valve can be integrated directly in the hydraulic transmission control device.

According to some embodiments, the disconnect clutch (K0) 115 can be a clutch which is closed in the unactuated condition (normally closed clutch) and which should be opened, i.e., continuously compressed, for fully electric driving operation. In case a hydraulic pump of the transmission is driven only by the electric machine 120, a problem would arise when the electric machine 120 does not rotate and the hydraulic pump is accordingly not driven. In that case, the disconnect clutch (K0) 115 cannot be compressed and accordingly also not opened. Therefore, it is provided in some embodiment examples of the present invention that the apparatus 200 for actuating the disconnect clutch 115 has an electrically operated hydraulic pump independent from the first drive unit 110 and/or second drive unit 120 for producing or providing the transmission hydraulic pressure level $p_1$. In other words, these embodiment examples provide—in addition to the electric machine 120—a second (smaller) electric machine for driving the hydraulic pump.

For a drive system without an electric auxiliary hydraulic pump of this kind, the electric machine 120 can initially be allowed to rotate by means of a correspondingly adapted or programmed control device when the vehicle is started. In this way, the internal combustion engine 110 can initially be pulled along by means of the normally closed disconnect clutch 115. However, there should be no ignition of the internal combustion engine 110 during the starting process; this can be achieved by means of an appropriately programmed engine control. As soon as a hydraulic pump driven by the rotating electric machine 120 has generated sufficient pressure for the transmission hydraulic pressure level $p_1$, the disconnect clutch (K0) 115 can be opened by means of the pressure converter 230 so that the rotational speed of the internal combustion engine 110 can decrease again to zero rpm (revolutions per minute). After this, a fully electric driving operation is possible. Thus according to embodiment examples of this kind, the apparatus 200 for actuating the disconnect clutch 115 can be designed to set in rotation the electric machine 120, which can be constructed particularly as an engine starter generator, when starting the vehicle and therefore also to set the internal combustion engine 110 in rotation without ignition by means of the unactuated, normally closed disconnect clutch 115. The vehicle start lasts until the transmission hydraulic level $p_1$ is reached so that the normally closed disconnect clutch 115 can finally be opened for an electric driving operation.

In order that the process just described takes place only once when starting the vehicle, it is provided in some embodiment examples that the speed of the electric machine 120 no longer drops to 0 rpm as driving proceeds (e.g., when the vehicle is stopped at a traffic light). Instead, the apparatus 200 for actuating the disconnect clutch 115 can be designed to allow the electric machine 120 to continue rotating at a predetermined speed also when the vehicle is stopped so that the electric machine 120 coupled with a hydraulic pump can supply a sufficient actuating pressure to keep the normally-closed disconnect clutch 115 open for electric driving operation. Starting processes and maneuvering processes would then be controlled by means of a starting clutch in the transmission 130. Thus the apparatus 200 can be designed to keep a speed of the electric machine 120 above a minimum speed during vehicle operation so that the transmission hydraulic pressure $p_1$ for actuating the disconnect clutch 115 is always maintained during operation by means of a hydraulic pump supplied by the electric machine 120.

According to some embodiments, the minimum speed of the electric machine 120 can be adjusted depending upon temperature. Due to a generally low leakage of hydraulic fluid, a lower minimum speed can be sufficient at low temperatures, e.g., 300 rpm at 20° C. A minimum speed higher than this can be adjusted at higher temperatures, e.g., 700 rpm at 100° C. hydraulic fluid temperature. Depending on the design of the disconnect clutch (K0) 115, an actuation pressure that is up to 50% lower than the maximum possible actuation pressure $p_1$, i.e., $0.5 \times p_1$, can be sufficient for keeping the clutch in the open position so that the (minimum) speed level of the electric machine 120 can also be decreased correspondingly.

In addition or alternatively, according to some embodiments, blocking means can also be provided in a high-pressure line from the pressure converter 230 to the concentric slave cylinder 310, which blocking means can be closed in an electrically controlled manner for fully electric driving. In embodiment forms of this kind, a hydraulic pump need not be continuously driven by the electric machine 120. Thus a controllable blocking element, e.g., a high-pressure valve, can be provided in a high-pressure line from the pressure converter 230 to the actuating element 220, 310 in order to maintain the disconnect clutch hydraulic pressure level $p_2$ in the high-pressure line independently from a hydraulic pump by controlling the blocking element in a corresponding manner.

According to further embodiments of the present invention, the disconnect clutch (K0) 115 can also be a clutch which is open in the unactuated condition (normally open clutch) and which is actuated or compressed for coupling the internal combustion engine 110 to the drivetrain. A normally open disconnect clutch of this kind could remain uncompressed or unactuated in fully electric machine operation. The normally open disconnect clutch 115 can first be hydraulically actuated or compressed when the internal combustion engine 110 is to be switched on or when driving is to take place by means of the internal combustion engine. When the internal combustion engine 110 is switched on, the speed of the electric machine 120 is generally above an idling speed of the internal combustion engine 110, so that there would be sufficient pressure or a sufficient transmission hydraulic pressure level $p_1$ in this case to actuate the disconnect clutch 115.

The features disclosed in the preceding description, the following claims and in the drawings can be important individually as well as in any combination for implementing the invention in its various embodiments.

While some aspects of the present invention have been described in connection with an apparatus for actuating a disconnect clutch which is hydraulically actuated or can be hydraulically actuated, it will be appreciated that these aspects also represent a description of a corresponding method so that a module or a component of an apparatus is also to be comprehended as a corresponding method step or as a feature of a method step, for example, a method for the actuation of the disconnect clutch. Similarly, aspects which have been described in connection with, or as, a method step also represent a description of a corresponding module or detail or feature of a corresponding apparatus.

Depending on certain implementation requirements, embodiment examples of the invention can be implemented as hardware or as software. The implementation can be carried out using a digital storage medium, for example, a floppy disk, a DVD, a Blu-ray disk, a CD, a ROM, a PROM, an EPROM, an EEPROM or a flash storage, a fixed disk or other magnetic or optical storage on which electronically readable control signals are stored which can, or do, cooperate with a programmable hardware component in such a way that the respective method is carried out.

A programmable hardware component can be formed by a control device, a processor, a computer processor (CPU or central processing unit), a computer, a computer system, an application-specific integrated circuit (ASIC), an integrated circuit (IC), a system on a chip (SOC), a programmable logic element or field programmable gate array (FPGA) with a microprocessor.

Therefore, the digital storage medium can be machine-readable or computer-readable. Some embodiment examples accordingly include a data carrier having electronically readable control signals which are capable of cooperating with a programmable computer system or a programmable hardware component so as to carry out one of the methods described herein. Accordingly, one embodiment example is a data carrier (or a digital storage medium or a computer-readable medium) on which the program for implementing one of the methods described herein is stored.

In general, embodiments of the present invention can be implemented as program, firmware, computer program or computer program product with a program code or as data, wherein the program code or the data operate(s) so as to implement one of the methods when the program runs on a processor or a programmed hardware component. The program code or the data can also be stored, for example, on a machine-readable medium or data carrier. The program code or the data can be provided inter alia as source code, machine code or byte code or as another intermediate code.

Further, another embodiment is a data stream, a signal flow or a sequence of signals constituting the program for implementing one of the methods described herein. The data stream, signal flow or sequence of signals can be configured, for example, so as to be transferred via a data communications link, for example, via the Internet or other network, particularly a CAN (Controller Area Network). Accordingly, embodiment examples are also signal sequences which represent data and which are suitable for sending over a network or data communications link, wherein the data represent the program.

A program according to an embodiment can implement one of the methods when executed, for example, in that this program reads storage locations or writes a datum or a plurality of data into the latter so that, as the case may be, switching processes or other processes are brought about in transistor structures, amplifier structures or in other components operating electrically, optically, magnetically or in some other way. In a corresponding manner, data, values, sensor values or other information can be detected, determined or measured by a program by reading a storage location. Therefore, a program can detect, determine or measure quantities, values, measured quantities and other information by reading one or more storage locations and can cause, initiate or execute an action and control other devices, machines and components by writing to one or more storage locations.

The embodiments described above only illustrate the principles of the present invention. It will be appreciated that modifications and variations of the arrangements and details described herein will be clear to other skilled persons. Therefore, it is intended that the invention be limited only by the protective scope of the appended patent claims and not by the specific details which were presented with reference to the description and explanation of the embodiment examples.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for actuating a disconnect clutch arranged between a first drive unit and a second drive unit of a hybrid drive, the disconnect clutch being hydraulically actuatable in order to one of couple and decouple the first drive unit one of to and from the rest of a powertrain, the apparatus comprising:
   an actuating element for hydraulically actuating the disconnect clutch; and
   a pressure converter arranged between the actuating element and a hydraulic medium supply for a transmission in order to adapt a transmission hydraulic pressure level to a disconnect clutch hydraulic pressure level required for actuating the disconnect clutch;
   wherein the actuating element includes a concentric slave cylinder arranged on a high-pressure side of the pressure converter for actuating the disconnect clutch.

2. The apparatus according to claim 1, wherein the disconnect clutch hydraulic pressure level is higher than the transmission hydraulic pressure level so that a ratio between the disconnect clutch hydraulic pressure level and the transmission hydraulic pressure level lies in a range between 3 and 10.

3. The apparatus according to claim 1, wherein the actuating element is adapted to actuate the concentric slave cylinder by way of a hydraulic fluid used in the transmission.

4. The apparatus according to claim 3, wherein the hydraulic fluid includes a hydraulic disconnect fluid.

5. The apparatus according to claim 1, further comprising:
   a hydraulic control; and
   a sensor arrangement coupled to the hydraulic control in order to detect a release travel of the disconnect clutch and control the transmission hydraulic pressure level based on the release travel.

6. An apparatus for actuating a disconnect clutch arranged between a first drive unit and a second drive unit of a hybrid drive, the disconnect clutch being hydraulically actuatable in order to one of couple and decouple the first drive unit one of to and from the rest of a powertrain, the apparatus comprising:
   an actuating element for hydraulically actuating the disconnect clutch; and
   a pressure converter arranged between the actuating element and a hydraulic medium supply for a transmission in order to adapt a transmission hydraulic pressure level to a disconnect clutch hydraulic pressure level required for actuating the disconnect clutch,
   wherein an input-side low-pressure cylinder and an output-side high-pressure cylinder of the pressure converter are integrated in the transmission.

7. The apparatus according to claim 6, further comprising:
   a control device; and
   a proportional valve controlled by the control device and for controlling the low-pressure cylinder of the pressure converter with the hydraulic medium.

8. The apparatus according to claim 1, wherein the disconnect clutch is a clutch which is closed in an unactuated condition, the apparatus for the comprising:
   a hydraulic pump for producing the transmission hydraulic pressure level, the hydraulic pump being operated electrically independently from at least one of the first drive unit and the second drive unit.

9. The apparatus according to claim 1, wherein the first drive unit is an internal combustion engine, and wherein the second drive unit is an electric machine.

10. The apparatus according to claim 9, wherein the electric machine is an electric motor.

11. The apparatus according to claim 9, wherein the disconnect clutch is a clutch which is closed in an unactuated condition, and wherein the apparatus is adapted to set the electric machine in rotation when starting a vehicle and to set the internal combustion engine in rotation without ignition by the unactuated disconnect clutch until the transmission hydraulic pressure level is reached so that the disconnect clutch can be opened for an electric driving operation.

12. The apparatus according to claim 11, wherein the electric machine is a starter generator.

13. The apparatus according to claim 9, wherein the apparatus is adapted to keep a speed of the electric machine above a minimum speed while operating a vehicle so that the transmission hydraulic pressure level for actuating the disconnect clutch is always maintained during operation by a hydraulic pump supplied by the electric machine.

14. The apparatus according to claim 13, wherein the minimum speed can be adjusted depending upon temperature.

15. The apparatus according to claim 9, further comprising:
a controllable blocking element provided in a high-pressure line from the pressure converter to the actuating element in order to maintain the disconnect clutch hydraulic pressure level in the high-pressure line independently from a hydraulic pump by controlling the blocking element in a corresponding manner.

16. The apparatus according to claim 9, wherein the disconnect clutch is a clutch which is open in an unactuated condition and which is actuated for coupling the internal combustion engine to the powertrain.

17. A method for actuating a disconnect clutch arranged between a first drive unit and a second drive unit of a hybrid drive, and capable of a actuation by a hydraulic actuating element in order to one of couple and decouple the first drive unit one of to and from the rest of a powertrain, wherein the actuating element includes a concentric slave cylinder arranged on a high-pressure side of the pressure converter for actuating the disconnect clutch, the method comprising:
adapting a transmission hydraulic pressure level to a disconnect clutch hydraulic pressure level that is required for the actuation of the disconnect clutch by a pressure converter arranged between the actuating element and a hydraulic medium supply for a transmission.

18. A computer program with a program code for controlling a hydraulic pump coupled to a pressure converter so that a hydraulic pressure level of a transmission environment can be adapted by the pressure converter to a disconnect clutch hydraulic pressure level required for actuating a disconnect clutch when the computer program runs on a programmable hardware component.

* * * * *